United States Patent
Garaas

(10) Patent No.: US 12,430,792 B1
(45) Date of Patent: Sep. 30, 2025

(54) ITEM PICK POSE RECOVERY

(71) Applicant: Amazon Technologies, Inc., Seattle, WA (US)

(72) Inventor: Tyler W. Garaas, Boxford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 888 days.

(21) Appl. No.: 17/527,725

(22) Filed: Nov. 16, 2021

(51) Int. Cl.
| | |
|---|---|
| *G06T 7/73* | (2017.01) |
| *B25J 9/16* | (2006.01) |
| *B25J 13/08* | (2006.01) |
| *G06T 1/00* | (2006.01) |
| *G06T 7/12* | (2017.01) |

(52) U.S. Cl.
CPC .............. *G06T 7/73* (2017.01); *B25J 9/1687* (2013.01); *B25J 9/1697* (2013.01); *B25J 13/089* (2013.01); *G06T 1/0014* (2013.01); *G06T 7/12* (2017.01); *G06T 2207/10028* (2013.01); *G06T 2207/30204* (2013.01)

(58) Field of Classification Search
CPC .......... G06T 7/73; G06T 1/0014; G06T 7/12; G06T 2207/10028; G06T 2207/30204; B25J 9/1687; B25J 9/1697; B25J 13/089
See application file for complete search history.

(56) References Cited

U.S. PATENT DOCUMENTS

| | | | | |
|---|---|---|---|---|
| 9,616,569 | B2 * | 4/2017 | Uhlenbrock | B25J 9/1697 |
| 10,451,405 | B2 * | 10/2019 | Clayton | G06T 7/292 |
| 11,986,955 | B2 * | 5/2024 | Agarwal | B25J 9/1697 |
| 2022/0277472 | A1 * | 9/2022 | Birchfield | G06V 10/82 |

FOREIGN PATENT DOCUMENTS

| | | | | |
|---|---|---|---|---|
| CA | 3071332 A1 * | 1/2019 | | B25J 9/162 |
| GB | 2600504 A  * | 5/2022 | | B25J 11/0045 |
| WO | WO-2022251905 A1 * | 12/2022 | | G06T 7/001 |

* cited by examiner

*Primary Examiner* — Jacob S. Scott
*Assistant Examiner* — Erin Morris
(74) *Attorney, Agent, or Firm* — Eversheds Sutherland (US) LLP

(57) ABSTRACT

Dynamic pick pose recovery is described. The concepts can be relied upon to determine the pose of an item during a process for picking, moving, and placing the item among totes, or other uses. In one example, an item can be picked using a robotic arm, and the item can be repositioned for placement at a second location. Images of the item can be captured as the item moves. The images can be segmented to determine masks of the item. The masks can be projected into a point cloud within a bounding volume, to generate contours. Points of the point cloud that are positioned outside the contours can be discarded, to find a subset of points representative of a pose of the item. The position and orientation of the item can be calculated, for placement of the item at a second location, based on the pose of the item.

16 Claims, 10 Drawing Sheets

ITEM PICK POSE RECOVERY

BACKGROUND

Robotic systems can be relied upon for automating certain manual tasks, sometimes reducing the costs and time associated with the tasks. Today, robotic systems are designed and constructed to incorporate complicated control, feedback, and information processing systems to handle relatively complicated tasks. Robotic systems can be used for many different purposes, including those for which humans are not well suited, such as in dangerous environments and for repetitive manufacturing processes.

Robotic systems can be directed based on feedback generated by computer-implemented image processing and vision techniques in some cases. Computer vision is related to the use of computing systems to extract and develop meaningful data from digital images or videos, among other types of data. Computer vision includes acquiring, processing, and analyzing images, extracting data from the images, and manipulating the data for certain applications or tasks. The image processing and analyzing can encompass the transformation of images and the extraction and generation of data from the images, sometimes using models based on geometry, physics, statistics, and learning theories.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, robotic systems can be directed based on feedback generated by computer-implemented image processing and vision techniques in some cases. Computer vision techniques can encompass acquiring, processing, and analyzing images, extracting data from the images, and manipulating the data for certain applications or tasks. Computer vision techniques can rely upon models based on geometry, physics, statistics, and learning theories.

In the context of robotic systems and computer vision, various aspects of dynamic pick pose recovery are described herein. The concepts can be relied upon to determine the pose of an item during a process for picking, moving, and placing the item among totes, among other uses. In one example, an item can be picked from a first tote using a robotic arm, and the item can be repositioned for placement at a second location in a second tote. Images of the item can be captured as the item moves from the first location to the second location. The images can be segmented to determine masks of the item. The masks can be projected into a point cloud within a bounding volume, to generate contours. Points of the point cloud that are positioned outside the contours can be discarded, to find a subset of points representative of a pose of the item. The position and orientation of the item can be calculated, for placement of the item at a second location, based on the pose of the item.

Figure 1:
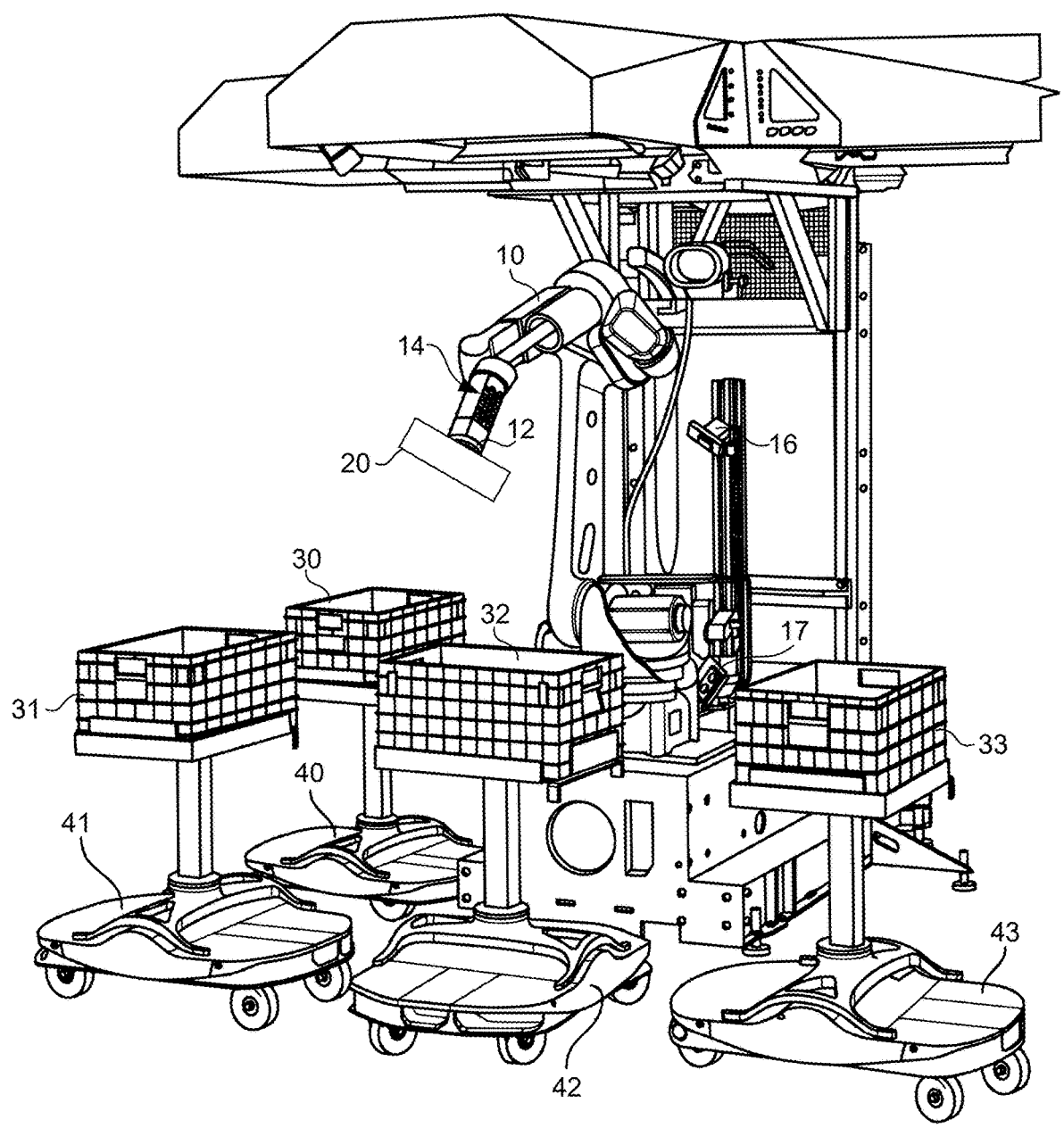
FIG. 1 depicts a scenario of item repositioning among totes using pick pose recovery according to example embodiments described herein.

Turning to the drawings for additional context, FIG. 1 depicts a scenario of item repositioning among totes using pick pose recovery according to example embodiments described herein. FIG. 1 illustrates an example robotic arm 10 in a materials handling facility. The robotic arm 10 is picking and placing items, such as the item 20, among the totes 30-33. As shown, the robotic arm 10 has picked the item 20 from the tote 30 and is calculating a trajectory to place the item 20 into the tote 32, as part of a process to consolidate items among the totes 30-33.

The robotic arm 10 is a type of mechanical arm capable of movements similar to those of a human arm. The robotic arm 10 includes a number of links or joints that allow rotational and translational displacement or movement. The links or joints form a kinematic chain, and the kinematic chain terminates with an end effector 12. The end effector 12 can pick up items or objects through gripping or grabbing armatures or linkages, the use of vacuum or suction, and other means. Thus, the end effector 12 can be any suitable impactive, ingressive, astrictive, contigutive, or other end of arm tool capable of holding or gripping items for transport. The end effector 12 is capable of picking and placing a variety of different types, sizes, shapes, and weights of items and is analogous to the human hand in some ways. The illustration of the end effector 12 is provided as an example in FIG. 1, and other types of end effectors can be relied upon.

As part of the consolidation process shown in FIG. 1, the robots 40-43 can reposition the totes 30-33, respectively, within reach of the robotic arm 10. In the example shown, the tote 30 is positioned for the robotic arm 10 to pick items, including the item 20, from within the tote 30. The totes 31-33 are positioned to permit the robotic arm 10 to place items, including the item 20, into the totes 31-33. Thus, the scenario shown in FIG. 1 facilitates the consolidation of various items from the tote 30 to the totes 31-33.

The scenario shown in FIG. 1 is one example of a use case for a robotic system incorporating the concepts of item pick pose recovery described herein. The concepts are not limited to use with any particular types of robotic systems. The robotic arm 10 is illustrated as one example system that can be directed using estimated pose information, but other types of robotic systems can use the pose information to perform various tasks.

Additionally, the concepts can be applied to moving and repositioning items among other types of containers, including containers of different types, sizes, and shapes than those shown. As used herein, an "item" can also reference a box or container in which a number of smaller items are enclosed or stored. Thus, the concepts can be applied to individual or separate items, with or without packaging, as well as to larger groups, boxes, or containers of items. The concepts can also be applied to items or containers moving on conveyor belts, for example, or stationary items or containers. The concepts are also not limited to moving or consolidating items among containers, as they can be applied to pick and place (i.e., reposition) items among any locations. The concepts can also be applied to a range of other problems besides automated pick and place operations, as the concepts rely upon a new approach at pose estimation based on computer vision techniques.

According to the example shown in FIG. 1, the robotic arm 10 is directed in part based on a pose estimation of the item 20. To that end, the robotic arm 10 includes fiducial markers 14 in some cases. The fiducial markers 14 can be placed or positioned on certain surfaces of the robotic arm 10 to establish a spatial reference point for pose estimation. The robotic arm 10 also includes cameras 16 and 17, among possibly others. The cameras 16 and 17 are used to capture images or videos of the item 20, as the item 20 is being picked from the tote 30 and moved along a trajectory to one of the totes 31-33. Additional aspects of the fiducial markers 14 and the cameras 16 and 17 are described in further detail below.

The images of the item 20 can be processed by a computing device or environment for pose estimation using computer vision techniques, as described in further detail below, to develop a spatial, volumetric model of the item 20. The model is representative of a pose of the item 20. Among other information, the pose of the item 20 can include the length, width, and height dimensions (or related volumetric dimensions) of the item 20, along with an orientation of the item 20. The pose of the item 20 can also include one or more degrees of freedom of the item 20. The pose can be embodied as a data model representative of the contours, shape, dimensions, orientation, and other parameters related to the item 20. The computing device or environment can store and further process the data model as needed to perform any suitable tasks. The computing device or environment can also direct the operations of the robotic arm 10 based on the pose of the item 20.

Using the pose of the item 20, the computing device or environment can execute algorithms directed to autonomous path planning. The computing device or environment can direct the robotic arm 10 to place the item 20 at a certain location within the tote 32, for example, to avoid voiding (i.e., empty space) in the tote 32. In that sense, the robotic arm 10 can be directed to place the item 20 at a certain location and in a certain orientation (i.e., rotation, angle, etc.) among a number of other items that are already positioned within the tote 32, to maximize the use of space in the tote 32. The robotic arm 10 can also be directed to place the item 20 to avoid damaging it, to avoid crushing other items in the tote 32, and to account for other concerns. Because the pose estimate for the item 20 encompasses volumetric and degree of freedom information for the item 20, the computing device or environment can account for the shape and size of the item 20 when determining where and how to place it into the tote 32, among other items.

The pose recovery process can be implemented as part of autonomous path planning while the item 20 is moving along a certain path or trajectory by the robotic arm 10. Thus, pick and place operations can continue without delay due to the pose recovery process, and the specifics of the place operation can be calculated while the item 20 is moving. The pose recovery process described herein can be relied upon for faster, efficient consolidation of items, among other benefits.

Figure 2:
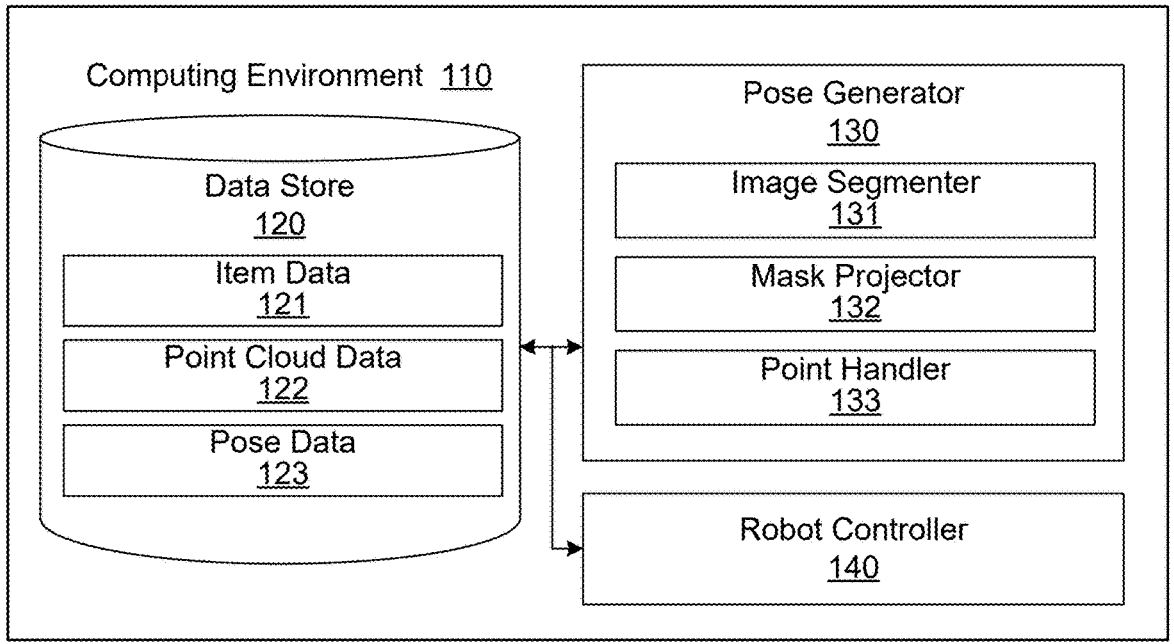
FIG. 2 illustrates a networked environment for item pick pose recovery according to example embodiments described herein.
Figure 2:
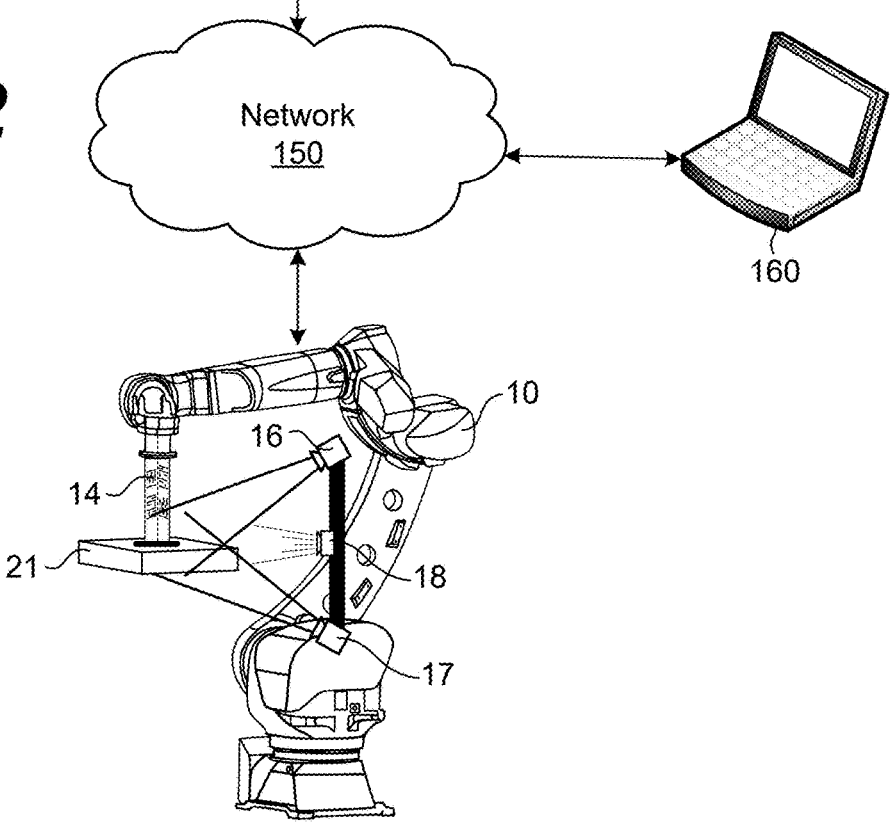

To describe the concepts in greater detail, FIG. 2 illustrates a networked environment 100 for item pick pose recovery according to example embodiments described herein. In addition to the robotic arm 10, the networked environment 100 includes a computing environment 110, a network 150, and a client device 160. The computing environment 110 includes a data store 120, a pose generator 130, and a robot controller 140, each of which is described in further detail below.

The computing environment 110 can be embodied as one or more computing devices or systems, including memory devices. As one example, the computing environment 110 can include one or more desktop computers, laptop computers, or related computing devices arranged in one or more server or computer banks. The computing environment 110 can also be embodied as one or more embedded processing devices or systems, possibly including application specific processors and memories. The components of the computing environment 110 can be located at a single installation site or distributed among different geographic locations. For example, the pose generator 130 can be embodied as a first computing device located at a first location, and the robot controller 140 can be embodied as a second computing device located at a second location.

In another example, the computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources vary over time.

The computing environment 110 can also be embodied in part as various functional or logical elements (e.g., executed computer-readable instructions, logic circuitry, processing circuitry, etc.) executed or operated by the computing environment 110 to direct it to perform aspects of the embodiments described herein. In that context, the pose generator 130 and the robot controller 140 can be embodied as functional or logical elements of the computing environment 110. The operations of the pose generator 130 and the robot controller 140 are described in further detail below with reference to FIGS. 3-9.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with the robotic arm 10 and the client device 160 using any suitable systems interconnect models and/or protocols. As examples, the computing environment 110 can communicate with the robotic arm 10 and the client device 160 using internet protocol (IP), transmission control protocol (TCP), hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), and/or other protocols for communicating data over the network 150, without limitation. Although not illustrated, the network 150 can include connections to any number of network hosts, such as website servers, file servers, networked computing resources, databases, data stores, or any other network or computing architectures.

The client device 160 is representative of one or more client devices. The client device 160 can be embodied as any computing device, processing circuit, or processor-based device or system, including those embodied in the form of a desktop computer, a laptop computer, a personal digital assistant, a wearable computing device, a cellular telephone, a tablet computer, an augmented reality device, or a virtual reality device, among other example computing devices and systems. The client device 160 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 160.

The client device 160 can execute various applications. The client device 160 can be used to access, control, and/or modify the operations of the computing environment 110 and the robotic arm 10, among other purposes. An individual using the client device 160 can access, control, monitor, and modify the operations of the computing environment 110, including the pose generator 130 and the robot controller 140, via the network 150.

As noted above, the robotic arm 10 is a type of mechanical arm capable of movements similar to those of a human arm, and the robotic arm 10 is shown moving an item 21 in FIG. 2. The fiducial markers 14 are placed or positioned on certain surfaces of the robotic arm 10 to establish a spatial reference point for pose estimation. In one example, each of the fiducial markers 14 includes a binary matrix of black and white elements enclosed within a black border. For a given fiducial marker 14, the internal structure or arrangement of the black and white elements is uniquely encoded to establish a spatial relationship between the marker and the end effector 12 of the robotic arm 10, a joint or link of the robotic arm 10, or another feature of the robotic arm 10 using computer vision processing techniques. Data related to each of the fiducial markers 14 and the spatial relationships between the fiducial markers 14 and the robotic arm 10 can be stored in the data store 120 for reference by the pose generator 130. The fiducial markers 14 can include a number of such spatial reference points, such that one, two, or more reference points can be captured by the cameras 16 and 17 as images of the item 21 are taken. The fiducial markers 14 can be implemented using ArUco markers, as one example, but other spatial references can be relied upon.

The cameras 16 and 17 are shown mounted to a pole or other mechanical linkage that is also attached to the robotic arm 10, along with a light source 18. The light source 18 is representative of any suitable light source or light sources sufficient to illuminate items for image capture. Two cameras 16 and 17 are shown in FIG. 2, although any number of cameras can be used among the embodiments. Additionally, the positions, viewing frustums, and other parameters of the cameras 16 and 17 can vary among the embodiments. In other examples, the cameras 16 and 17, among possibly others, can be mounted or positioned around the robotic arm 10, without being attached or mounted to it. Also, in some cases, the cameras 16 and 17 can be used for other purposes beyond pose estimation, such as to identify item or product UPCs, product damage, or other information related to items being picked by the robotic arm 10.

The cameras 16 and 17 can be embodied as any suitable type of image sensor(s) capable of capturing images at any resolution, imaging speed, and imaging accuracy, with optics in some cases. In some cases, the cameras 16 and 17 can be embodied as high-resolution cameras capable of capturing images at resolutions of 300 pixels per inch (ppi) or higher. The cameras 16 and 17 can also be embodied as groups of cameras, including the capability of capturing depth information, although conventional two-dimensional (2-D) image sensors can be used.

The data store 120 can store information related to the cameras 16 and 17, among other cameras, such as the relative or absolute positions of the cameras 16 and 17 with relation to the robotic arm 10, the operating characteristics of the cameras 16 and 17, the viewing frustums of the cameras 16 and 17, and other information. This information can be referenced and processed by the pose generator 130 and the robot controller 140, as described below.

Turning back to the computing environment 110, the data store 120 includes a memory area for the storage of item data 121, point cloud data 122, and pose data 123, among other types of data. The item data 121 includes data related to various items, such as the items contained in the totes 30-33, among others. The item data 121 can include the uniform product code (UPC), standard identification number, and other unique identifier information on the items contained in the totes 30-33. The item data 121 can also include other details related to the items, such as product name, product size and dimensions, packaging size and dimensions, product weight, product category, product inventory, and other data. The item data 121 can also include details related to packaging or packaging materials, such as the size, shape, and dimensions of certain boxes, containers, or other types of packaging.

The point cloud data 122 includes data relied upon for pose estimation as described herein. The point cloud data 122 can include separate data related to a number of different items. As one example, a point cloud associated with the item 21 can start as a plurality of points that are evenly distributed three-dimensionally within a 3D bounding volume. The size and shape of the bounding volume, and the number of points in the point cloud (i.e., the density of the points), can be determined based on certain factors described below. The pose generator 130 can trim or discard points from the point cloud based images captured using the cameras 16 and 17, to find a subset of points representative of a pose of the item 21. The remaining subset of points can be used as an estimate of pose as described in further detail below. Additional examples are described below with reference to FIGS. 3-9.

The pose data 123 includes pose information as described herein. The pose data 123 can include separate pose information for a number of different items, including the item 21. In some cases, the pose data 123 can be determined, in part, based on a minimal bounding box or bounding volume that encompasses or surrounds the remaining subset of points in a point cloud, after trimming the point cloud. In other cases, the pose data 123 can be determined using only the remaining subset of points in a point cloud after trimming. Among other information, the pose of the item 21 can include length, width, and height dimensions of the item 20, along with the orientation of the item 20. The pose can also include one or more degrees of freedom of the item 20. Additional examples are described below with reference to FIGS. 3-9.

The pose generator 130 is configured to perform a number of algorithms directed to autonomous path planning. The pose generator 130 performs image-based processing, manipulation, inspection, and evaluation, to generate data suitable for robotic guidance and control. The algorithms performed and data generated by the pose generator 130 can be used for vision-based automation, manufacturing, inspection, measurement, picking, placing, and other operations. The pose generator 130 includes the image segmenter 131, the mask projector 132, and the point handler 133, among possibly other components.

The robot controller 140 is configured to direct the movement and operations of the robotic arm 10. The robot controller 140 is configured to perform path planning for the robotic arm 10 and control the movement and operations of the robotic arm 10 using telematics control data and/or signals communicated over the network 150. The robot controller 140 can rely upon data stored in the data store 120, including the pose data 123, to perform autonomous path planning for the robotic arm 10. More particularly, the robot controller 140 can be configured to direct the movement and operations of the robotic arm 10 to pick and place the item 21 at certain locations using the pose data 123. The robot controller 140 can direct the robotic arm 10 to place the item 21 at a certain location and in a certain orientation to maximize the use of space, to avoid damaging items, and to account for other concerns. Because the pose data 123 includes volumetric and degree of freedom information for the item 21, the robot controller 140 is configured to account for the shape and size of the item 21 when determining where and how to place it.

FIGS. 3-9 include a number of illustrations related to the operations of the pose generator 130 and the robot controller 140. The examples are described in the context of the robotic arm 10, the item 21, the fiducial markers 14, and the cameras 16 and 17 shown in FIG. 2, but the concepts can be applied to other robotic systems, items, types and positions of markers, and arrangements of cameras.

Figure 3:
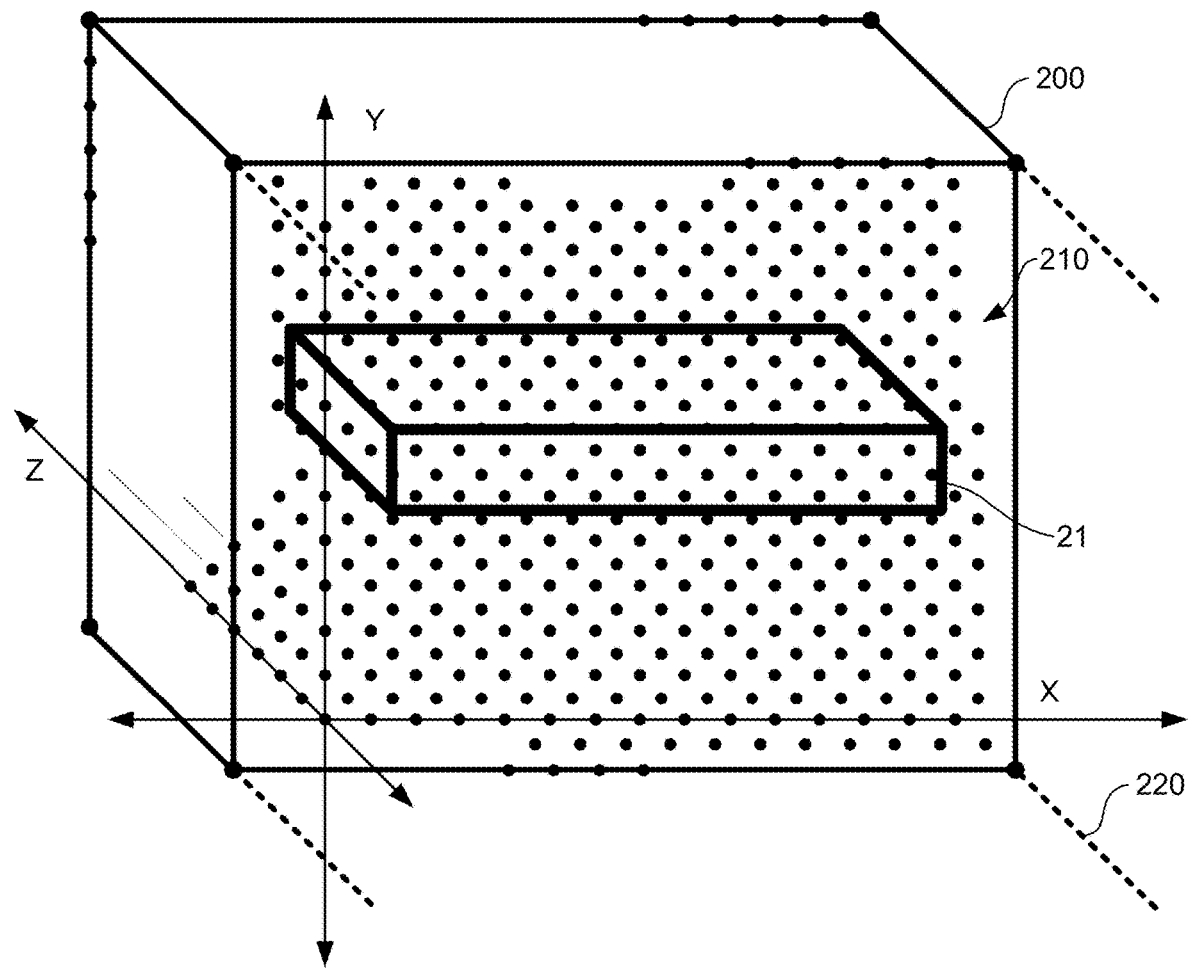
FIG. 3 illustrates an example of a point cloud and the capture of an image of an item within the point cloud according to example embodiments described herein.

FIG. 3 illustrates an example of a bounding volume 200 filled with a point cloud 210 and an example image of the item 21 in an area within the bounding volume 200. In the example shown, the bounding volume 200 is a 3D bounding volume. At any suitable time during the process of pick pose estimation, the point handler 133 can establish a data structure representative of the bounding volume 200 and the point cloud 210. The point handler 133 is configured to generate the bounding volume 200 based on an area or volume in which images of the item 21 are expected to be captured by the cameras 16 and 17, as the item 21 is being repositioned by the robotic arm 10. As described in further detail below, the point cloud 210 is refined (e.g., trimmed, clipped, modified, etc.) to arrive at a subset of the points in the point cloud 210 that are representative of the volume of space occupied by the item 21. In that sense, the bounding volume 200 forms the outer perimeter or boundary, in three dimensions, which the point cloud 210 occupies in space.

The edges or boundaries of the bounding box can be established based on the viewing frustum 220 of the camera 16, the viewing frustum 221 of the camera 17 (see FIG. 4), or a combination of the viewing angles or frustums of the cameras 16 and 17, among other cameras, the positions of the fiducial markers 14, and other spatial information known to the point handler 133. The shape and size of the bounding volume 200 is representative in FIG. 3, and the point handler 133 can establish bounding boxes of other shapes and sizes. One example size of the bounding volume 200 can be one cubic yard or one cubic meter, although other sizes and shapes can be relied upon. The bounding volume 200 can also vary based on the size or shape of the item picked by the robotic arm 10 in some cases. Data related to the bounding volume 200 can be stored in the data store 120 for processing by the point handler 133. The data can include dimensional and spatial data defining the size, shape, and position of the bounding volume 200 in space, using an absolute or relative frame of reference with respect to the robotic arm 10 or another frame of reference.

Using the perimeter established by the bounding volume 200, the point handler 133 is configured to spawn, populate, or fill the point cloud 210 within the bounding volume 200. In one example, the point cloud 210 can be embodied as a data structure that defines the positions of respective points that form the point cloud 210. The point cloud 210 can be embodied as points that are evenly distributed three-dimensionally within the volume of the bounding volume 200, in one example. The point cloud 210 can be established using any suitable density of points (e.g., points per cubic inch, cubic centimeter, etc.) based on the resolution desired for pose estimation and the processing capacity of the computing environment 110. The data structure can be stored in the data store 120 as the point cloud data 122.

Figure 4:
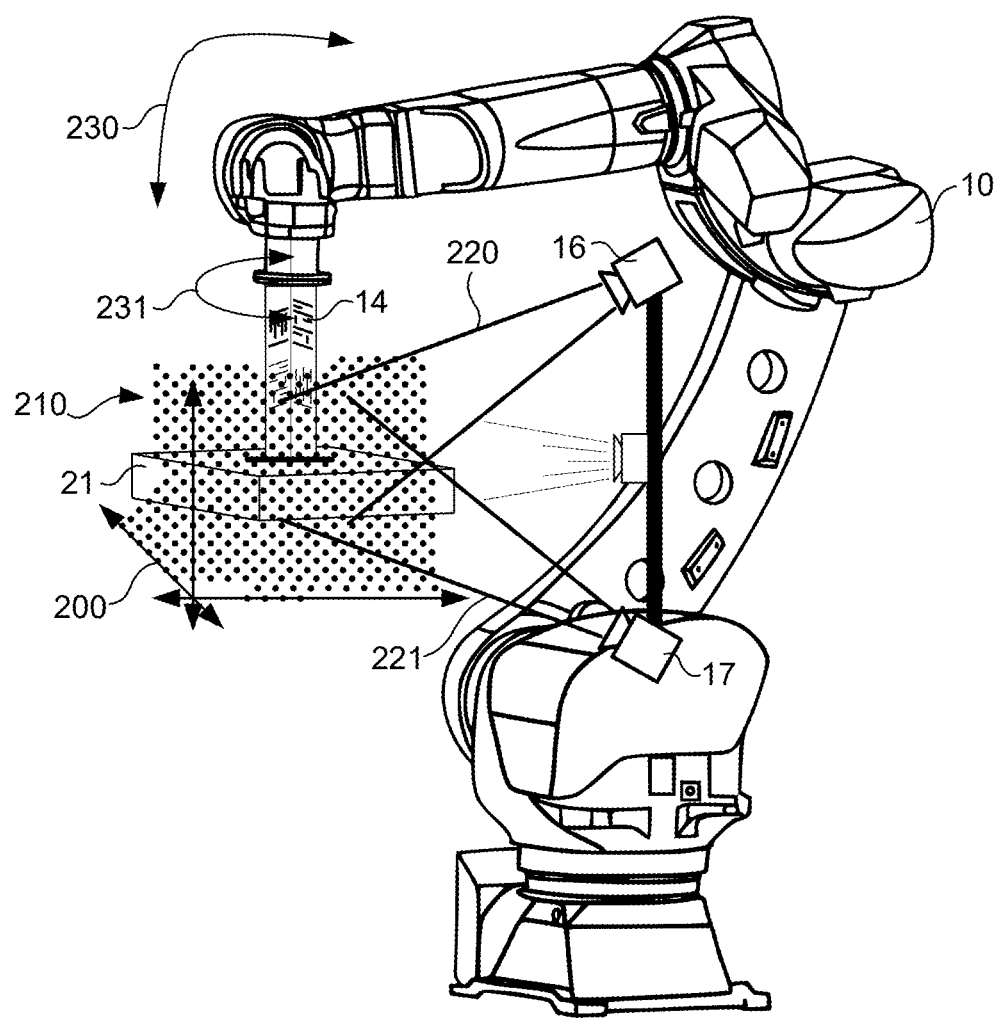
FIG. 4 illustrates an example of spatially referencing the bounding volume shown in FIG. 3 to a robotic arm and the capture of images of an item according to example embodiments described herein.

FIG. 4 illustrates an example of spatially referencing the bounding volume 200 and the point cloud 210 shown in FIG. 3 to the robotic arm 10 according to example embodiments described herein. Before the point cloud 210 is manipulated by the point handler 133, the point handler 133 is configured to spatially reference one or both of the bounding volume 200 and the point cloud 210 to some feature of the robotic arm 10, such as the end of arm tool of the robotic arm 10. The spatial referencing can occur separately for each image captured by the cameras 16 and 17, based on the images captured.

The point handler 133 can attach or spatially reference the bounding volume 200 by synchronizing the position of bounding volume 200 to a known position of the robotic arm 10, in three dimensions, using telemetry data associated with the robotic arm 10 at an instant in which an image of the item 21 was captured. In one example, robotic telemetry data, including the absolute or relative position of the robotic arm 10 can be resolved by the robot controller 140 at a time when each image is captured by the cameras 16 and 17. This telemetry data for the robotic arm 10 can be combined with calibrated position information associated with the cameras 16 and 17, to spatially reference the bounding volume 200 and the point cloud 210 to the robotic arm 10.

In another case, the point handler 133 is configured to spatially reference the bounding volume 200 and the point cloud 210 to one or more of the fiducial markers 14 on the robotic arm 10, because the fiducial markers 14 are present in images captured by the cameras 16 and 17. In this way, it may be unnecessary to rely upon the calculated position information of the robotic arm 10 at any particular time and the calibration information of the cameras 16 and 17, which avoids errors in calibration or minor movements in the cameras 16 and 17 among image captures. The spatial referencing accounts for movements of the robotic arm 10 over time, which result in movements in the orientation of the item 21, between image captures. The spatial referencing can be performed for each image captured by the cameras 16 and 17, among others, and facilitates accurate pose estimation and autonomous path planning while the item 21 is moving along a trajectory determined by the robotic arm 10. In other cases, a combination of the telemetry data associated with the robotic arm 10 and the fiducial markers 14 can be used to spatially reference the bounding volume 200 and the point cloud 210.

Figure 5:
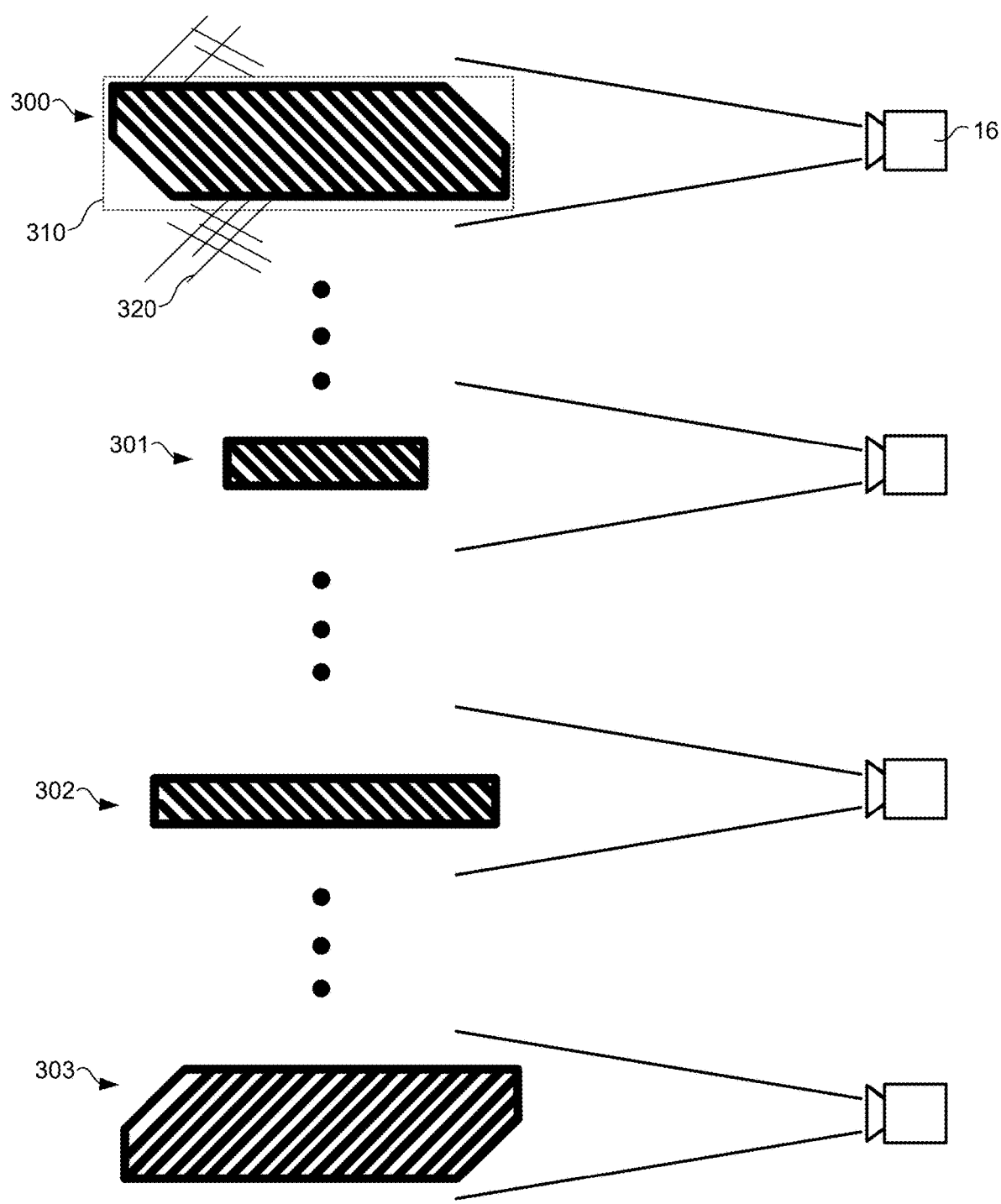
FIG. 5 illustrates an example of image capture and segmentation according to example embodiments described herein.

FIG. 5 illustrates an example of image capture and segmentation according to example embodiments described herein. At the outset, it is noted that the pose generator 130 can operate using any number of images of the item 21, captured by any number of cameras at any angles or viewpoints, based on the level of accuracy desired for pose estimation, the amount of time and processing resources available, and other concerns. From top to bottom of the page in FIG. 5, a number of masks 300-303 are shown. The masks 300-303 are provided as examples of masks of the item 21, each segmented from a respective image captured by the camera 16 as the item 21 is rotated.

The image segmenter 131 is configured to generate the masks 300-303 of the item 21, among others, from images captured by the camera 16, the camera 17, and possibly other cameras over time. The image segmenter 131 can perform a segmentation algorithm, such as instance segmentation, to delineate the distinct objects in images captured by the cameras 16 and 17. The YOLACT instance segmentation algorithm can be relied upon as one example, although other instance segmentation algorithms can be relied upon. Among other information, the image segmenter 131 can return a mask of the item 21, such as the masks 300-303, along with masks of other items. Thus, the image segmenter 131 is configured to detect and delineate pixels attributed to the item 21, as compared to other items, and possibly delineate pixels attributed to other items in images captured by the cameras 16 and 17. The image segmenter 131 can also be configured to assign a label to each pixel or mask associated with a distinct object or item in each image.

For each image processed, the output of the image segmenter 131 can be referred to as a segmentation result or a detection. The segmentation results or detections can be stored in the data store 120 for further processing by the pose generator 130. The segmentation results generated by the image segmenter 131 can include item or object masks, segmentation bounding boxes, confidence scores, and class labels, among other information. In the example shown in FIG. 5, the masks 300-303 are example results provided for four separate images captured of the item 21, each captured by the camera 16 at a different time while the item 21 was being moved and rotated by the robotic arm 10. The mask 300, for example, delineates or identifies pixels in an image that are attributed to the item 21, as compared to pixels that are attributed to a background 320 or other items in the image.

As noted above, the segmentation results generated by the image segmenter 131 also include segmentation bounding boxes, confidence scores, and class labels. An example segmentation bounding box 310 is shown for the mask 300 in FIG. 5. The segmentation bounding box 310 can be used by the pose generator 130 to estimate the pose of the item 21 in some cases. A confidence score is a metric related to the accuracy in detection of masks, bounding boxes, and class labels, and confidence scores that can be used by the pose generator 130 for certain purposes are described below. Examples of class labels include "cuboid," "plastic bag," "paper bag," "bubble wrap," "cylinder," "liquid," and "other" classes. The image segmenter 131 can be trained to distinguish among different classes of objects or items, and the classes can be associated with shapes and materials of items. The robot controller 140 can reference the class labels as an additional data input for autonomous path planning and control of the robotic arm 10.

The pose generator 130 can evaluate each segmentation result generated by the image segmenter 131. As described in further detail below, the pose generator 130 can evaluate the segmentation results, including the bounding boxes, the confidence scores, and the class labels, to determine if a particular segmentation result should be discarded. For example, the pose generator 130 can discard a segmentation result if it includes a confidence level below a certain threshold, fails to identify any mask for the item 21, returns a partial or broken mask for the item 21, includes masks for multiple objects, or for other reasons.

Figure 6:
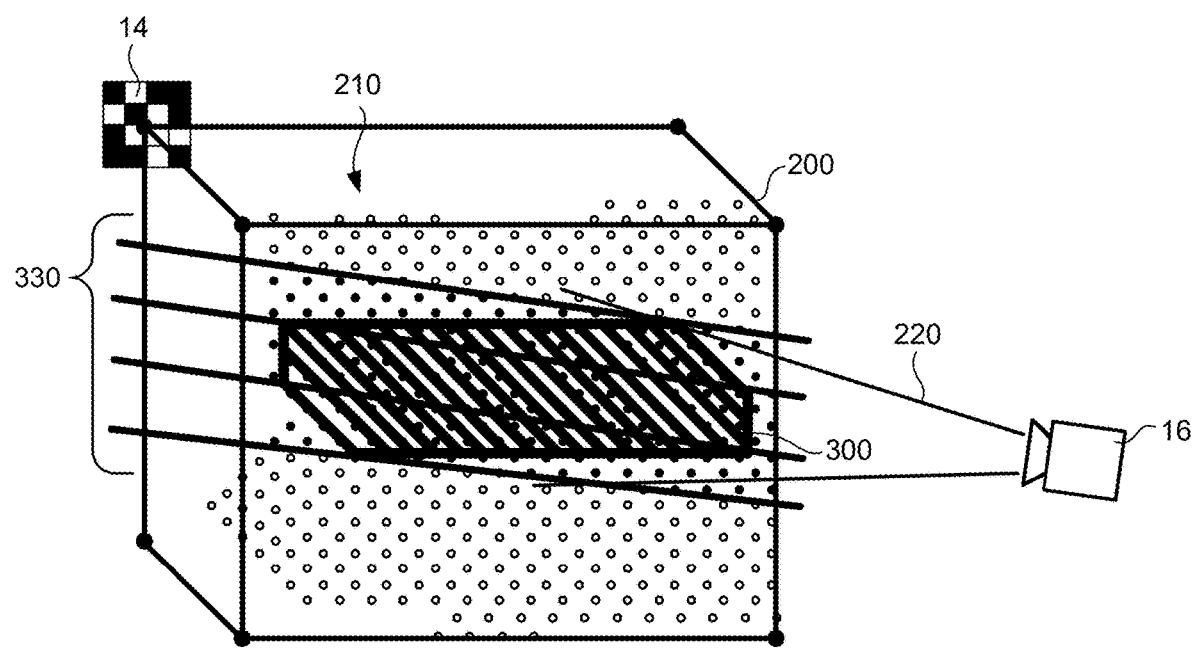
FIG. 6 illustrates an example of image projection and point discarding according to example embodiments described herein.

FIG. 6 illustrates an example of image projection and point discarding according to example embodiments described herein. After the masks 300-303 are generated by the image segmenter 131, the mask projector 132 is configured to perform a number of operations using the masks 300-303. For the mask 300 shown in FIG. 6, for example, the mask projector 132 is configured to project or cast a geometric representation of the mask 300 into the bounding volume 200, to generate a contour 330 that extends through the bounding volume 200. The geometric projection can occur after the point handler 133 has spatially referenced the bounding volume 200 and the point cloud 210 to the fiducial marker 14, as shown in FIG. 6. The geometric representation and the contour 330 can be developed using a geometric model of space, the known viewing frustum 220 of the camera 16, the known spatial reference between the bounding volume 200, the fiducial marker 14, and the robotic arm 10, and other data stored in the data store 120.

The contour 330 can be a 3D volume or polygon within the bounding volume 200 and, as shown in FIG. 6, is defined in part based on the shape and size of the mask 300. The contour 330 is representative of the possible space that the item 21 could occupy within the bounding volume 200, as a 3D model of the item 21, considering the angle of the camera 16, the position of the robotic arm 10, and the attributes of the mask 300. Using the contour 330 as a guide, the point handler 133 can identify or delineate between points in the point cloud 210 that may overlap in space with the actual space occupied by the item 21. In the example shown in FIG. 6, the solid points of the point cloud 210 are within the contour 330 and may ultimately contribute to a subset of points representative of a pose of the item 21. The open or hollow points of the point cloud 210 are outside of the contour 330 and may be discarded. A point among the point cloud 210 that is on, against, or coincides with the contour 330 can be a contributing or discarded point in various embodiments.

Figure 7:
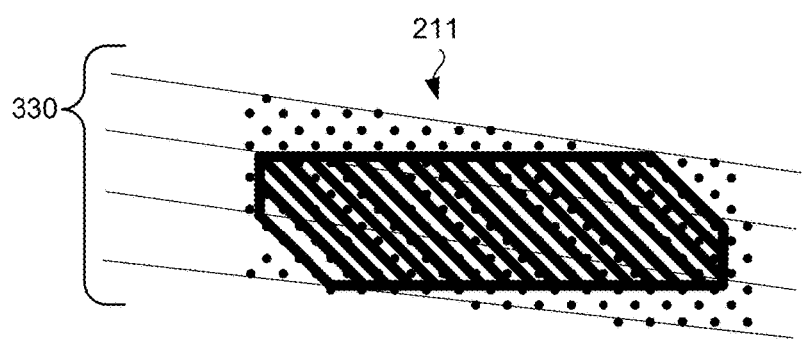
FIG. 7 illustrates an example of point cloud trimming according to example embodiments described herein.

FIG. 7 illustrates an example of point cloud trimming according to example embodiments described herein. As shown in FIG. 7, the original point cloud 210 shown in FIG. 6 has been trimmed to a subset of points 211 using the contour 330. The point handler 133 is configured to reference the contour 330 and to discard any points in the point cloud 210 that are outside of the contour 330. The result of this discarding process provides the subset of points 211 shown in FIG. 7. The mask projection and point discarding processes shown in FIGS. 6 and 7 can be performed for each mask 300-303 of the item 21, among possibly others. Each step of mask projection and point discarding continues to further refine, trim, or clip away points from the subset of points 211 using the masks 300-303. The subset of points 211 can be stored in the data store 120 as part of the point cloud data 122, for reference and processing by the pose generator 130 during these mask projection and point discarding processes.

Figure 8:
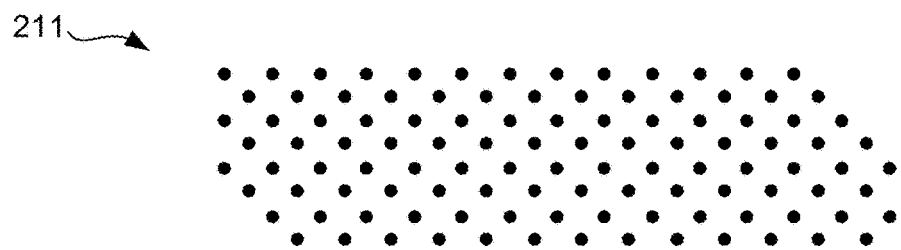
FIG. 8 illustrates an example of a subset of points in a point cloud according to example embodiments described herein.

FIG. 8 illustrates an example of the subset of points 211 after the point handler 133 has discarded points from the point cloud 210 for each mask 300-303 of the item 21. As compared to the subset of points 211 shown in FIG. 7, the subset in FIG. 8 has been further trimmed or clipped to be a more accurate 3D model of the volume of the item 21. The pose of the item 21 can be determined based on the subset of points 211, as described in further detail below, because the subset of points 211 is representative of a spatial, volumetric model of the item 21.

Figure 9:
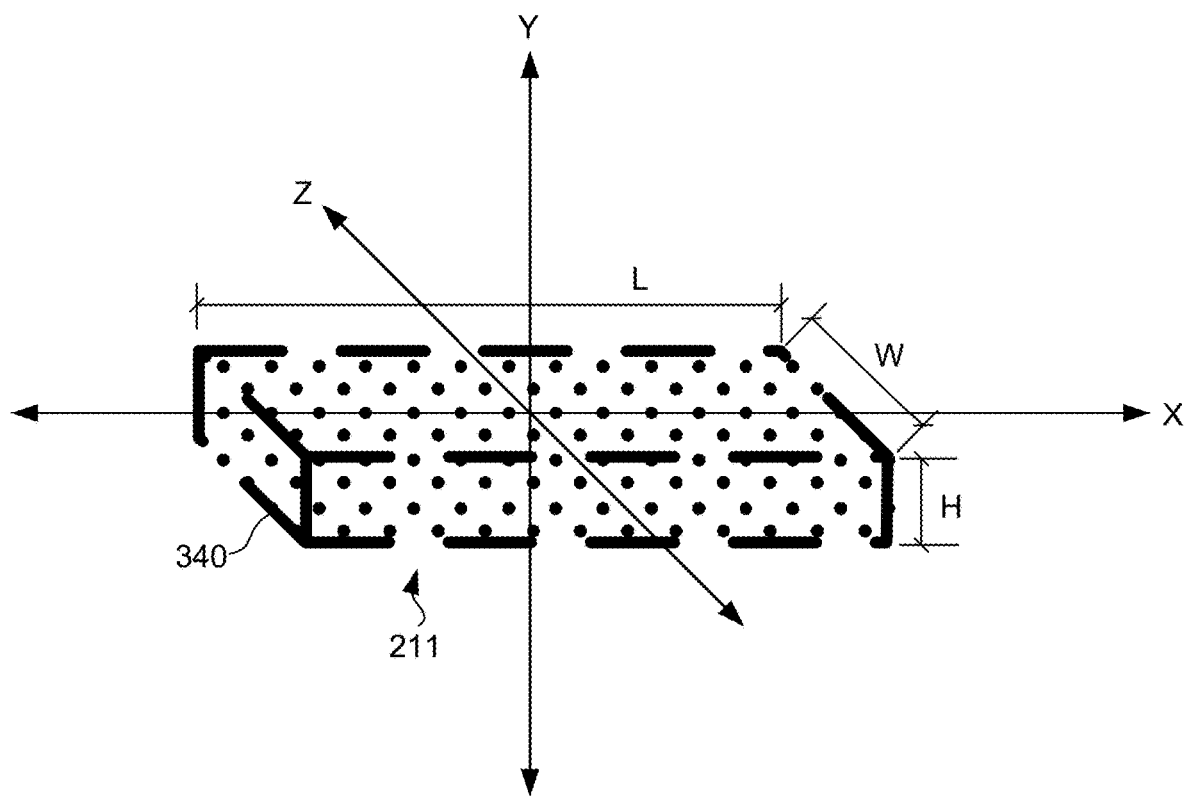
FIG. 9 illustrates an example of a bounding box around the subset of points shown in FIG. 8 according to example embodiments described herein.

FIG. 9 illustrates an example of a bounding box 340 fitted or positioned around the subset of points 211 shown in FIG. 8. The pose generator 130 can fit the bounding box 340 around the subset of points 211. In one example, the bounding box 340 can be a 3D cuboid polygon of minimal size or volume that encompasses or surrounds the subset of points 211. The bounding box 340 can be referenced by the pose generator 130 as an estimate of the outside surfaces of the item 21, for example, or for other purposes. The pose generator 130 can rotate the subset of points 211 and rotate and resize the bounding box 340 to find the minimal fit of the bounding box 340 to the subset of points 211. The bounding box 340 can also be formed using other 3D shapes, such as cylindrical, spherical, torus, prism, and other shapes.

Using the subset of points 211, the bounding box 340, or a combination thereof, the pose generator 130 is configured to determine a pose for the item 21. Among other information, the pose for the item 21 can include the length "L," width "W," and height "H" dimensions of the item 21 and the orientation around the "X," "Y," and "Z" axis references, for example, as shown in FIG. 9. The pose shown for the item 21 in FIG. 9 is only representative, as the pose can encompass other dimension, degree of freedom, and related information for the item 21. In some cases, the orientation for the item 21 can be tied or referenced to the degrees of freedom of the robotic arm 10, so that the robot controller 140 can easily calculate new orientations for the item 21 using the pose of the item 21.

Figure 10:
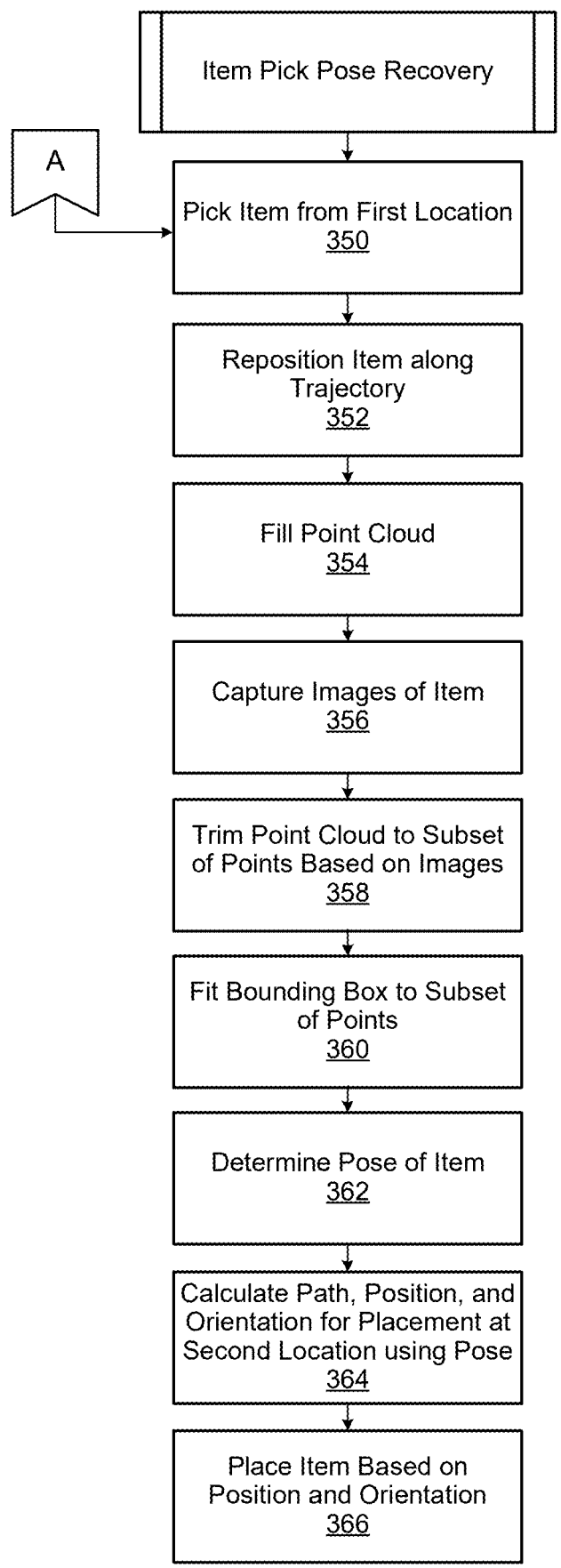
FIG. 10 illustrates a process for pick pose recovery performed by the computing environment shown in FIG. 2 according to various example embodiments described herein.

FIG. 10 illustrates a process for pick pose recovery performed by the computing environment 110 shown in FIG. 2. The process flow is representative in FIG. 10, and the process flow is not exhaustive of all the processing steps that can be performed according to the concepts. An order of execution of two or more blocks can be scrambled relative to the order shown. Also, two or more blocks shown in succession can be executed concurrently or with partial concurrence. Further, in some cases, one or more of the blocks can be skipped or omitted.

At reference numeral 350, the process includes picking an item from a first location using a robotic system, such as a robotic arm 10. For example, the robot controller 140 can direct the robotic arm 10 to pick an item, such as the item 20 or the item 21, from a first location in one of the totes 30-33. The robot controller 140 can direct the robotic arm 10 to pick various items as part of a consolidation process among the totes 30-33, or for other reasons. The remaining steps are described in connection with a pick and place operation for the item 21, but the process can be adapted for other items.

At reference numeral 352, the process includes repositioning the item 21 along a trajectory for placement of the item at a second location. Here, the robot controller 140 can send telematics control data and/or signals over the network 150, to direct the robotic arm 10 to move the item 21 toward the second location for placement.

At reference numeral 354, the process includes filling a point cloud within a bounding volume. For example, the point handler 133 can establish the bounding volume 200 shown in FIG. 2 and fill it with a point cloud 210. The point handler 133 is configured to generate the bounding volume 200 based on an area or volume in which images of the item 21 are expected to be captured by the cameras 16 and 17, as the item 21 is being repositioned by the robotic arm 10. In later steps, the point cloud 210 can be refined (e.g., trimmed, clipped, modified, etc.) to arrive at a subset of the points in the point cloud 210 that are representative of the volume of space occupied by the item 21. In that sense, the bounding volume 200 forms the outer perimeter or boundary, in three dimensions, which the point cloud 210 occupies in space.

At reference numeral 356, the process includes capturing one or more images or videos of the item. Here, the cameras 16 and 17 can be used to capture images or videos of the item 21, as the item 21 is being picked and moved along a trajectory for placement. The pose generator 130, the robot controller 140, or both can direct the operation of the cameras 16 and 17 to capture the images or videos, and the images or videos can be stored in the data store 120 for further processing. The process can also include capturing and reading one or more bar codes or other computer-readable tags on the item 21, such as a UPC or other identifier, using one or more of the cameras 16 and 17. In some cases, the item data 121 can be cross-referenced with the computer-readable tags on the item 21, to determine the size, shape, and dimensions of the item 21 or the packaging of the item.

At reference numeral 358, the process includes trimming the point cloud 210 generated at reference numeral 354 based on one or more of the images captured at reference numeral 356, to find a subset of points 211 representative of a pose of the item. Additional details related to trimming the point cloud 210 are described below with reference to FIG. 11. The result of the process steps at reference numeral 358 is the reduction of the point cloud 210 generated at reference numeral 354 to a subset of points, such as the subset of points 211 shown in FIG. 8.

At reference numeral 360, the process includes fitting a bounding box to the subset of points. As one example, the pose generator 130 can fit the bounding box 340 around the subset of points 211, as shown in FIG. 9. The bounding box 340 can be a 3D cuboid polygon of minimal size or volume that encompasses or surrounds the subset of points 211. The bounding box 340 can be referenced by the pose generator 130 as an estimate of the outside surfaces of the item 21, for example, or for other purposes. The pose generator 130 can rotate the subset of points 211 and rotate and resize the bounding box 340 to find the minimal fit of the bounding box 340 to the subset of points 211. The bounding box 340 can also be formed using other 3D shapes, such as cylindrical, spherical, torus, prism, and other shapes.

In some cases, an estimate of the bounding box may be known, beforehand, based on the item data 121 associated with the item, as determined by capturing and reading bar codes or other computer-readable tags on the item 21 at reference numeral 356. In this case, the bounding box that is fitted to the subset of points at reference numeral 360 can be cross-referenced with the expected size, shape, and dimensions of the item 21 according to the item data 121, as a measure of accuracy. Alternatively, the step of fitting at reference numeral 360 can start with a bounding box of a predetermined shape and size based on the item data 121 for the item 21, and this predetermined bounding box can be rotated and manipulated for a best fit with the subset of points 211.

At reference numeral 362, the process includes determining a pose of the item based on one or both of the subset of points and the bounding box. Using the subset of points 211, the bounding box 340, or a combination thereof, the pose generator 130 is configured to determine a pose for the item 21. Among other information, the pose for the item 21 can include the length "L," width "W," and height "H" dimensions of the item 21 and the orientation of the item 21 around the "X," "Y," and "Z" axis references, for example, as shown in FIG. 9. The pose shown for the item 21 in FIG. 9 is only representative, as the pose can encompass other dimension, degree of freedom, and related information for the item 21. In some cases, the orientation of the item 21 can be tied or referenced to the degrees of freedom of the robotic arm 10, so that the robot controller 140 can easily calculate new orientations for the item 21 using the pose of the item 21. The pose of the item 21 can be stored in the data store 120 as the pose data 123.

At reference numeral 364, the process includes calculating a path, position, and orientation for placement of the item 21 at the second location based on the pose of the item. Here, the robot controller 140 can rely upon data stored in the data store 120, including the pose data 123, to perform autonomous path planning for the robotic arm 10 to place the item 21. For example, referring to the pose for the item 21 as input, the robot controller 140 can execute an algorithm for autonomous path planning for the item 21. The robot controller 140 can calculate a trajectory or path for the robotic arm 10 to place the item 21 at a certain location within the tote 32, for example.

One object of the path calculation can be to avoid voiding (i.e., empty space) in the tote 32. The robot controller 140 can also calculate the trajectory or path such that the item 20 is placed at a certain location and in a certain orientation (i.e., rotation, angle, etc.) among a number of other items that are already positioned within the tote 32, to maximize the use of space in the tote 32, using the pose of the item 21 as input. The path can also be calculated to avoid damage to the item 21, to avoid crushing other items in the tote 32, and to account for other concerns. Because the pose for the item 21 encompasses volumetric and degree of freedom information for the item 21, the robot controller 140 can account for the shape and size of the item 21 when determining a path, position, and orientation for placement.

At reference numeral 366, the process includes placing the item 21 based on the path, position, and orientation for placement calculated using the pose of the item 21. The robot controller 140 is configured to control the movement and operations of the robotic arm 10 using telematics control data and/or signals communicated over the network 150.

The process shown in FIG. 10 can be performed any number of times for consolidation of items among totes, for example. The concepts can also be applied to moving and repositioning items among other types of containers, including containers of different types, sizes, and shapes than those shown. The concepts can also be applied to containers moving on conveyor belts and stationary containers. The concepts are also not limited to moving or consolidating items among containers, as they can be applied to pick and place items among any locations. The concepts can also be applied to a range of other problems besides automated pick and place operations, as the concepts rely upon a new approach at pose estimation based on computer vision techniques.

Figure 11:
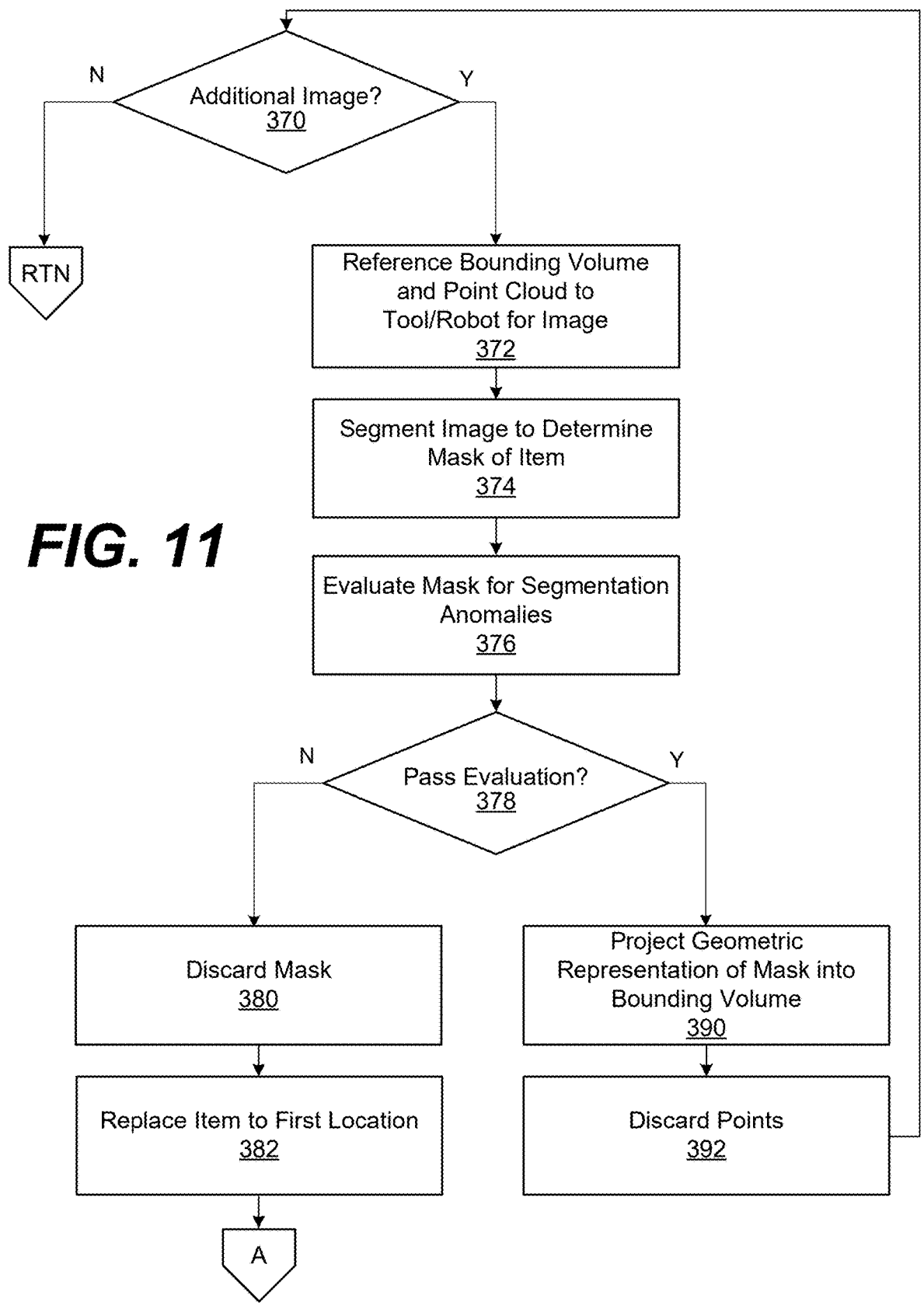
FIG. 11 further illustrates the process for pick pose recovery shown in FIG. 10 according to various example embodiments described herein.

FIG. 11 further illustrates the process for pick pose recovery shown in FIG. 10 according to various example embodiments described herein. The process steps shown in FIG. 11 are directed to trimming the point cloud at reference numeral 358 in FIG. 10. In other words, the trimming at reference numeral 358 in FIG. 10 includes the process steps shown in FIG. 11, among possibly others.

At reference numeral 370 in FIG. 11, the process includes determining whether or not to process an additional image captured by the cameras 16 and 17, to further refine the point cloud 210 formed at reference numeral 354 in FIG. 10. The trimming processes shown in FIG. 11 can be conducted using any number of images of the item 21 based on the level of accuracy desired for pose estimation, the amount of time and processing resources available, and other concerns. If additional images remain, then the process proceeds to reference numeral 372 to process the next image. The algorithms and processing steps shown in FIG. 11 can be performed individually for each image of the item 21. If no additional images remain, then the process returns to FIG. 10.

At reference numeral 372, the process includes spatially referencing the bounding volume 200 and point clouds 210 generated at reference numeral 354 in FIG. 10 to an end of arm tool of the robotic arm 10. For each image of the item 21 processed by the image segmenter 131, the point handler 133 is configured to spatially reference the bounding volume 200, the point cloud 210, or both to some feature of the robotic arm 10, such as the end of arm tool of the robotic arm 10. The spatial referencing can occur separately for each image captured by the cameras 16 and 17, based on the images captured.

In one case, the point handler 133 can attach or spatially reference the bounding volume 200 by synchronizing the position of bounding volume 200 to a known position of the robotic arm 10, in three dimensions. For example, the absolute or relative position of the robotic arm 10 can be resolved by the robot controller 140 at a time when each image is captured by the cameras 16 and 17. This position information for the robotic arm 10 can be combined with calibrated position information associated with the cameras 16 and 17, to spatially reference the bounding volume 200 and the point cloud 210 to the robotic arm 10.

In another case, the point handler 133 is configured to spatially reference the bounding volume 200 and the point cloud 210 to one or more of the fiducial markers 14 on the robotic arm 10, because the fiducial markers 14 are present in images captured by the cameras 16 and 17. In this way, it may be unnecessary to rely upon the calculated position information of the robotic arm 10 at any particular time and the calibration information of the cameras 16 and 17, which avoids errors in calibration or minor movements in the cameras 16 and 17 among image captures. The spatial referencing accounts for movements of the robotic arm 10 over time, such as movements in the degrees of freedom 230 and 231, between image captures.

At reference numeral 374, the process includes segmenting the image to determine a mask of the item 21. For example, depending on the image being processed, the image segmenter 131 can generate one of the masks 300-303 of the item 21 shown in FIG. 5. The image segmenter 131 can perform a segmentation algorithm, such as instance segmentation, to delineate the distinct objects in images captured by the cameras 16 and 17. The image segmenter 131 is configured to detect and delineate pixels attributed to the item 21, as compared to other items, and possibly delineate pixels attributed to other items in images captured by the cameras 16 and 17. The image segmenter 131 can also be configured to assign a label to each pixel or mask associated with a distinct object or item in each image. For each image processed, the output of the image segmenter 131 can be referred to as a segmentation result or a detection. The segmentation results generated by the image segmenter 131 can include item or object masks, segmentation bounding boxes, confidence scores, and class labels, among other information, as described above with reference to FIG. 5.

At reference numeral 376, the process includes evaluating the mask for segmentation anomalies. For example, the pose generator 130 can evaluate each segmentation result generated by the image segmenter 131. The pose generator 130 can evaluate the segmentation results, including the bounding boxes, the confidence scores, and the class labels, to determine if a particular segmentation result should be discarded.

At reference numeral 378, the process includes determining whether the mask passes an evaluation. Here, the pose generator 130 can determine whether or not the mask and segmentation result generated at reference numeral 374 is suitable for use in autonomous path planning, based on the evaluation conducted at reference numeral 376. For example, the pose generator 130 can decide to discard a segmentation result if it includes a confidence level below a certain threshold, fails to identify any mask for the item 21, returns a partial or broken mask for the item 21, includes masks for multiple objects, or for other reasons. The identification of two masks, for example, may suggest that the robotic arm 10 inadvertently picked two items. If the evaluation fails, then the process proceeds to reference numeral 380 in FIG. 11. If the evaluation passes, then the process proceeds to reference numeral 390 in FIG. 11.

At reference numeral 380, the process includes discarding the mask generated at reference numeral 374. As noted above, the pose generator 130 can discard a segmentation result if it includes a confidence level below a certain threshold, fails to identify any mask for the item 21, returns a partial or broken mask for the item 21, includes masks for multiple objects, or for other reasons. Discarding a mask generated for one image can conclude a pick and place operation. In that case, at reference numeral 382, the process includes replacing the item 21 to the first location where it was picked from, and the process can proceed back to the start of FIG. 10. However, in other cases, a single mask can be discarded without abandoning the pick and place operation. In that case, the process can proceed from reference numeral 380 to reference numeral 370, for operations on other images.

At reference numeral 390, the process includes projecting a geometric representation of the mask into the bounding volume to generate a contour of the bounding volume. For the mask 300 shown in FIG. 6, for example, the mask projector 132 is configured to project or cast a geometric representation of the mask 300 into the bounding volume 200 and the point cloud 210, to generate a contour 330 that extends through the bounding volume 200 and the point cloud 210. The geometric representation and the contour 330 can be developed using a geometric model of space, the known viewing frustum 220 of the camera 16, the known spatial reference between the bounding volume 200, the fiducial marker 14, and the robotic arm 10, and other data stored in the data store 120.

The contour 330 can be a 3D volume or polygon within the bounding volume 200 and, as shown in FIG. 6, is defined in part based on the shape and size of the mask 300 generated at reference numeral 374. The contour 330 is representative of the possible space that the item 21 could occupy within the bounding volume 200, as a 3D model of the item 21, considering the angle of the camera 16, the position of the robotic arm 10, and the attributes of the mask 300.

At reference numeral 392, the process includes discarding points among the point cloud that are positioned outside of the contour, to find a subset of points from the point cloud. Using the contour 330 as a guide, the point handler 133 can identify or delineate between points in the point cloud 210 that may overlap in space with the actual space occupied by the item 21. In the example shown in FIG. 6, the solid points of the point cloud 210 are within the contour 330 and may ultimately contributed to a subset of points representative of a pose of the item 21. The open or hollow points of the point cloud 210 are outside of the contour 330 and may be discarded or trimmed away at reference numeral 392. A point among the point cloud 210 that is on, against, or coincides with the contour 330 can be a contributing or discarded point in various embodiments.

In some cases, an estimate of the subset of points may be known, beforehand, based on the item data 121 associated with the item, as determined by capturing and reading bar codes or other computer-readable tags on the item 21 at reference numeral 356. In this case, the point cloud 210 can be trimmed, at least in part, based on the expected size, shape, and dimensions of the item 21 according to the item data 121. For example, the point cloud 210 can be trimmed first using the contour 330, and then further trimmed based on the expected size, shape, and dimensions of the item 21. Alternatively, the point cloud 210 can be trimmed first based on the expected size, shape, and dimensions of the item 21, and then further trimmed using the contour 330. After discarding or trimming points of the point cloud 210 at reference numeral 392, the process then proceeds back to reference numeral 370, for processing any additional images of the item 21.

The processes shown in FIGS. 10 and 11 can be relied upon to determine the pose of an item while picking, moving, and placing various items.

The pose recovery process can be implemented as part of autonomous path planning while items are moving along a certain path or trajectory by a robotic arm or related system. Pick and place operations can continue without delay due to the pose recovery process, and place operations can be tailored while the items are moving. The pose recovery process shown in FIGS. 10 and 11 can be relied upon for faster, efficient consolidation of items, among other benefits.

Figure 12:
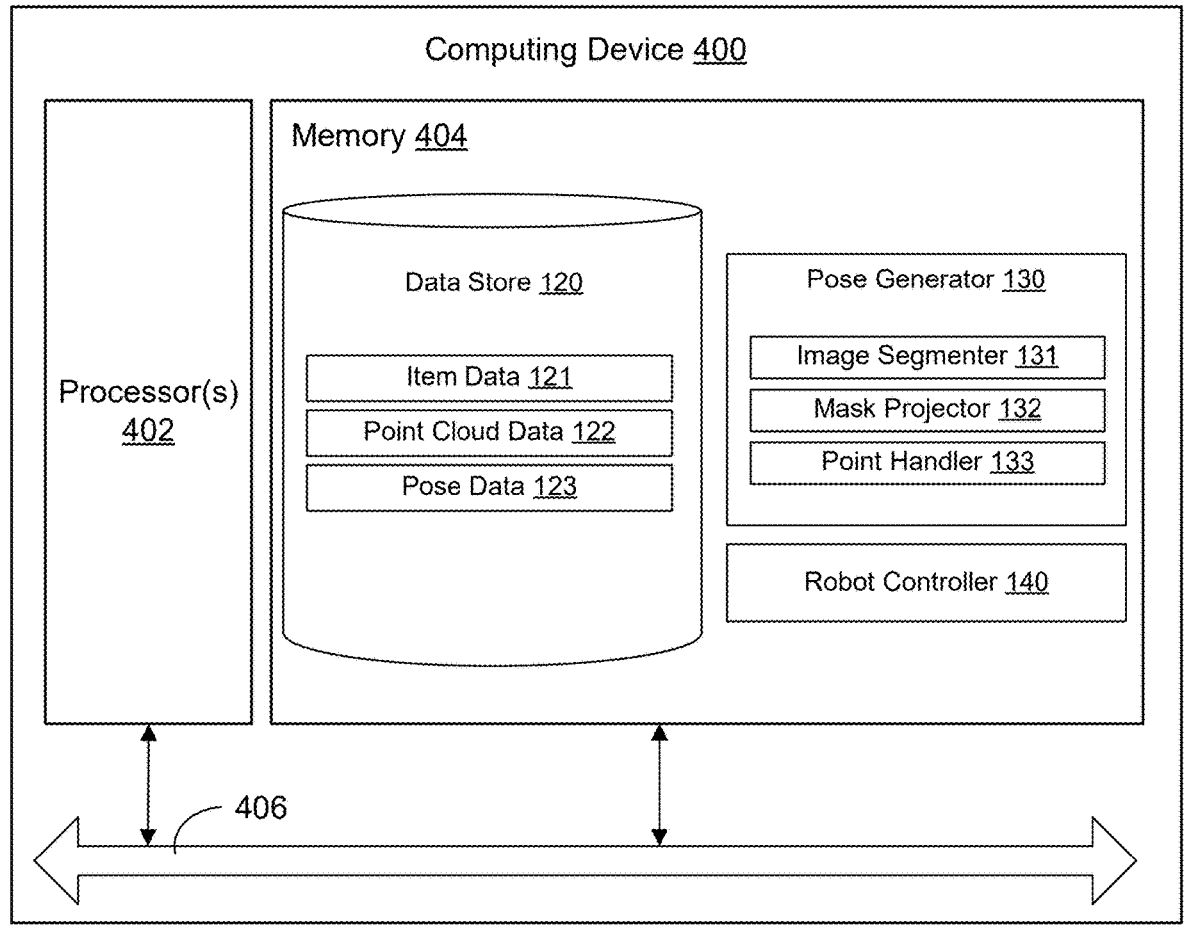
FIG. 12 illustrates an example schematic block diagram of a computing device for the computing environment shown in FIG. 2 according to various embodiments described herein.

FIG. 12 illustrates an example schematic block diagram of a computing device 400 for the computing environment 110 shown in FIG. 2 according to various embodiments described herein. The computing device 400 includes at least one processing system, for example, having a processor 402 and a memory 404, both of which are electrically and communicatively coupled to a local interface 406. The local interface 406 can be embodied as a data bus with an accompanying address/control bus or other addressing, control, and/or command lines.

In various embodiments, the memory 404 stores data and software or executable-code components executable by the processor 402. For example, the memory 404 can store executable-code components associated with the pose generator 130 and the robot controller 140, for execution by the processor 402. The memory 404 can also store data such as that stored in the data store 120, among other data.

It is noted that the memory 404 can store other executable-code components for execution by the processor 402. For example, an operating system can be stored in the memory 404 for execution by the processor 402. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 404 stores software for execution by the processor 402. In this respect, the terms "executable" or "for execution" refer to software forms that can ultimately be run or executed by the processor 402, whether in source, object, machine, or other form. Examples of executable programs include, for example, a compiled program that can be translated into a machine code format and loaded into a random access portion of the memory 404 and executed by the processor 402, source code that can be expressed in an object code format and loaded into a random access portion of the memory 404 and executed by the processor 402, or source code that can be interpreted by another executable program to generate instructions in a random access portion of the memory 404 and executed by the processor 402, etc.

An executable program can be stored in any portion or component of the memory 404 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 404 can include both volatile and nonvolatile memory and data storage components. Volatile components are those that do not retain data values upon loss of power. Nonvolatile components are those that retain data upon a loss of power. Thus, the memory 404 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 402 can be embodied as one or more processors 402 and the memory 404 can be embodied as one or more memories 404 that operate in parallel, respectively, or in combination. Thus, the local interface 406 facilitates communication between any two of the multiple processors 402, between any processor 402 and any of the memories 404, or between any two of the memories 404, etc. The local interface 406 can include additional systems designed to coordinate this communication, including, for example, a load balancer that performs load balancing.

As discussed above, the pose generator 130 and the robot controller 140 can be embodied, at least in part, by software or executable-code components for execution by general purpose hardware. Alternatively, the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIGS. 10 and 11 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 402. The machine code can be converted from the source code, etc. Further, each block can represent, or be connected with, a circuit or a number of interconnected circuits to implement a certain logical function or process step.

Also, any logic or application described herein, including the pose generator 130 and the robot controller 140 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 10 and 11. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for pose recovery, comprising:
   picking an item from a first location using a robotic arm;
   repositioning the item along a trajectory for placement of the item at a second location;
   filling a bounding volume with a point cloud, the bounding volume being representative of an area in which images of the item can be captured during the repositioning;
   capturing a plurality of images of the item as the item traverses along the trajectory;
   for individual ones of the plurality of images:
      spatially referencing the bounding volume to an end of arm tool of the robotic arm according to an orientation of the end of arm tool when an image among the plurality of images was captured;
      segmenting the image to determine a mask of the item;
      evaluating the mask for anomalies;
      projecting a geometric representation of the mask into the bounding volume to generate a contour of the bounding volume;
      discarding points of the point cloud positioned outside of the contour to find a subset of points representative of a pose of the item;
      calculating a position and orientation for placement of the item at the second location based on the pose of the item; and
      replacing the item to the first location using the robotic system.

2. The method of claim 1, wherein:
   the first location is within a first tote; and
   the position and orientation at the second location is among a plurality of other items within a second tote.

3. The method of claim 1, further comprising:
   fitting a bounding box to the subset of points; and
   determining the pose of the item based on at least one of the subset of points or the bounding box.

4. The method of claim 1, wherein the pose of the item comprises length, width, and height dimensions of the item and an orientation of the item.

5. A method for pose recovery, comprising:
   capturing a plurality of images of an item as the item is being repositioned from a first location to a second location by a robotic system;
   spatially referencing, by at least one computing device, a point cloud to an end of arm tool of the robotic system;
   trimming the point cloud based on the plurality of images to find a subset of points;
   calculating a position and orientation of the item based on the subset of points;
   segmenting an image among the plurality of images to determine a mask for the item;
   evaluating the mask for anomalies;
   discarding the mask in response to detection of a segmentation anomaly in the mask; and
   replacing the item to the first location using the robotic system.

6. The method of claim 5, wherein the plurality of images are captured while the item is in motion.

7. The method of claim 5, further comprising:
   before the trimming, filling a bounding volume with the point cloud, the bounding volume being representative of an area in which images of the item can be captured, wherein:
      the bounding volume comprises a three-dimensional (3D) bounding volume; and
      the point cloud comprises a plurality of points evenly distributed three-dimensionally within the 3D bounding volume.

8. The method of claim 7, further comprising spatially referencing the point cloud to the end of arm tool of the robotic system according to an orientation of the end of arm tool using a fiducial marker positioned on the robotic system.

9. The method of claim 5, further comprising:
   projecting a geometric representation of the mask into a bounding volume to generate a contour of the bounding volume; and
   discarding points of the point cloud positioned outside of the contour to find the subset of points representative of the pose of the item.

10. The method of claim 5, further comprising:
    fitting a bounding box to the subset of points; and
    determining the pose of the item based on at least one of the subset of points or the bounding box.

11. The method of claim 5, wherein the pose comprises length, width, and height dimensions of the item and orientation of the item.

12. A system for pose recovery, comprising:
    a robotic system;
    a memory device to store computer-readable instructions thereon; and
    at least one computing device configured through execution of the computer-readable instructions to:
       pick an item from a first location using the robotic system;
       capture a plurality of images of the item as the item traverses along a trajectory;
       segment an image among the plurality of images to determine a mask for the item;
       evaluate the mask for anomalies;
       discard the mask in response to detection of a segmentation anomaly in the mask;
       trim a point cloud based on the plurality of images to find a subset of points representative of a pose of the item;
       calculate a position and orientation of the item based on the subset of points; and
       replace the item to the first location using the robotic system.

13. The system of claim 12, wherein the plurality of images are captured while the item is in motion along the trajectory between the first location and the second location.

14. The system of claim 12, wherein the at least one computing device is further configured to:
    fill a bounding volume with the point cloud, the bounding volume being representative of an area in which images of the item can be captured, wherein:
       the bounding volume comprises a three-dimensional (3D) bounding volume; and the point cloud comprises a plurality of points evenly distributed three-dimensionally within the 3D bounding volume.

15. The system of claim 12, wherein the at least one computing device is further configured to spatially reference the point cloud to an end of arm tool of the robotic system according to an orientation of the end of arm tool using a fiducial marker positioned on the robotic system.

16. The system of claim 12, wherein the at least one computing device is further configured to:
  project a geometric representation of the mask into the point cloud to generate a contour;
  discard points of the point cloud positioned outside of the contour to find the subset of points representative of the pose of the item; and
  determine the pose of the item based on the subset of points.

\* \* \* \* \*